United States Patent [19]
Colwell et al.

[11] Patent Number: 5,303,361
[45] Date of Patent: Apr. 12, 1994

[54] SEARCH AND RETRIEVAL SYSTEM

[75] Inventors: Steve Colwell, Rochester, N.Y.; Lawrence S. Gross, Santa Monica; William T. Gross, Montrose, both of Calif.; Lee Hasiuk, Rochester, N.Y.; David Rolfe, Pasadena, Calif.

[73] Assignee: Lotus Development Corporation, Cambridge, Mass.

[21] Appl. No.: 466,750

[22] Filed: Jan. 18, 1990

Related U.S. Application Data

[63] Continuation-in-part of Ser. No. 436,146, Nov. 13, 1989, abandoned, which is a continuation-in-part of Ser. No. 336,963, Apr. 12, 1989, abandoned, which is a continuation-in-part of Ser. No. 298,366, Jan. 18, 1989, abandoned.

[51] Int. Cl.$^5$ ............................................... G06F 3/14
[52] U.S. Cl. ................................. 395/425; 364/920; 364/225.4
[58] Field of Search ... 364/200 MS File, 900 MS File, 364/521; 395/425, 600, 725, 800

[56] References Cited

U.S. PATENT DOCUMENTS

| | | |
|---|---|---|
| Re. 26,429 | 8/1968 | Kaufman et al. |
| 4,270,182 | 5/1981 | Asija ........................ 364/419.2 |
| 4,352,165 | 9/1982 | Hevenor, Jr. ................. 395/425 |
| 4,358,824 | 11/1982 | Glickman et al. ........... 364/419.19 |
| 4,408,181 | 10/1983 | Nakayama .................... 382/61 |
| 4,419,740 | 12/1983 | Hevenor, Jr. ................. 395/425 |
| 4,433,392 | 2/1984 | Beaven ...................... 395/425 |
| 4,495,566 | 1/1985 | Dickinson et al. ............ 395/600 |
| 4,703,425 | 10/1987 | Muraki ...................... 364/419 |
| 4,815,029 | 3/1989 | Barker ...................... 364/900 |
| 4,899,136 | 2/1990 | Beard ....................... 364/900 |
| 5,001,697 | 3/1991 | Torres ...................... 364/521 |
| 5,008,853 | 4/1991 | Bly ......................... 364/900 |

FOREIGN PATENT DOCUMENTS 0032194 7/1981 European Pat. Off. ...... G06F 15/40

OTHER PUBLICATIONS

Holland, "ZyINDEX: Full Text Retrieval Power", ONLINE, Jul. 1985, vol. 9, No. 4, pp. 38-42.
Licklider, "Stalking the Elusive File," BCS UPDATE, pp. 14-16, (May 1989).
"ViewLink", Links All of Your Existing Software Programs and Data, Traveling Software, Bothell, Wash. 98011, Brochure.
Wang in the News, "Ask An Intelligent Question And You'll Get An Intelligent Answer!"(Mar. 1989), p. 6.

Primary Examiner—David Y. Eng
Attorney, Agent, or Firm—Fish & Richardson

[57] ABSTRACT

A text search and retrieval system which builds an index representing every word in stored files created by a variety of applications, searches for requested words using the index and ranks the files based on the relative strength of match with the search request. From a display of the ranked filenames, the user can select a file, whereupon the file is tested to determine which one of a plurality of file viewers to deploy. The corresponding viewer is automatically loaded and used to display consecutive screens of information from the selected file. Further searching within the file is accomplished within the context of the viewer by matching character strings of a new search request with words in the items of the file produced by the viewer. To work on a file in view, the user can invoke the software application which created the file by loading the application corresponding to the viewer along with the desired file, without abandoning the search system.

23 Claims, 11 Drawing Sheets

Microfiche Appendix Included
(22 Microfiche, 2084 Pages)

| Original word ending | Associated endings |
|---|---|
| ies | y, ied, ier |
| ing | e, ings, es, ed, er, nothing |
| es | ed, er, e, nothing |
| ed | es, er, e, nothing |
| s | d, ses, nothing |
| x | xex, xed, xer |
| e | es, ed, er |
| y | ies, ied, ier |
| Anything else | s, ed, er |

FIG.6

```
Lotus Magellan         Use ↑↓ to View File to List        UPDATE    VIEW

94% LAUNDRY.488     USER INTERFACES:  DON'T MANIPULATE; DELEGATE!
  94% PUBLISH.488
  94% RESOURCE.488    Direct manipulation is the user's feeling that he's working
  94% SOFTWARE.588    intimately, rather than giving it commands. It's the differ
  91% CALENDAR.388    steering a car, and telling it go-left, go-right. With all
  91% CASETOOL.588    user-friendliness over the past few years, it is accepted th
  91% HOLISTIC.488    direct manipulation, but how then to account for cruise cont
  91% MOTIVES.688
  91% RESOURCE.288    Wouldn't it be nice to be able to map out the car's path bef
  91% RESOURCE.688    then relax and enjoy the ride?  Or better yet, tell it where
  88% CALENDAR.488    it figure out the route itself, obeying traffic laws and tra
  88% CHANNELS.288    with unfailing accuracy?  (Of course, we want to retain the
  88% CONTEXT.488     and make a detour if we see a particularly appealing sight i
  88% DOCUMENT.488    We're getting to the point in ███████ where users can learn
  88% FORUM.288       and plan routes, if we make it easy.
  88% KAPOR.288
  88% NUCLEUS.188     Half the trick in providing delegation-through-████████ is a
  88% OPENSOFT.688    the user doesn't have to bother with the details. The other
  88% SQLSERVR.188    him power without taking away granularity of control. He do
  ████████████        ██ to make all the choices; he wants to be able to spe
 File 27 of 63        C:\MAGELLAN\PRACTICE\UI.388  Text       Line 1 [1%]
──F1───F2────F3────────F4─────F5──────F6────F7──────F8─────F9───────F10───
  Help │ Copy │ Delete │ Print │ Gather │ Sort │ Launch │ Zoom │ Explore │ Quit
```

FIG.8

```
Lotus Magellan  Use +, - for Next, Previous Search String        UPDATE    FIND
 94% LAUNDRY.488   │USER INTERFACES:  DON'T MANIPULATE; DELEGATE!
 94% PUBLISH.488   │
 94% RESOURCE.488  │Direct manipulation is the user's feeling that he's working
 94% SOFTWARE.588  │intimately, rather than giving it commands. It's the differ
 91% CALENDAR.388  │steering a car, and telling it go-left, go-right. With all
 91% CASETOOL.588  │user-friendliness over the past few years, it is accepted th
 91% HOLISTIC.488  │direct manipulation, but how then to account for cruise cont
 91% MOTIVES.688   │
 91% RESOURCE.288  │Wouldn't it be nice to be able to map out the car's path bef
 91% RESOURCE.688  │then relax and enjoy the ride? Or better yet, tell it where
 88% CALENDAR.488  │it figure out the route itself, obeying traffic laws and tra
 88% CHANNELS.288  │with unfailing accuracy? (Of course, we want to retain the
 88% CONTEXT.488   │and make a detour if we see a particularly appealing sight
 88% DOCUMENT.488  │We're getting to the point in software where users can learn
 88% FORUM.288     │and plan routes, if we make it easy.
 88% KAPOR.288     │
 88% NUCLEUS.188   │Half the trick in providing delegation-through-software is a
 88% OPENSOFT.688  │the user doesn't have to bother with the details. The other
 88% SQLSERVR.188  │him power without taking away granularity of control. He do
 88% UI.388        │software to make all the choices; he wants to be able to spe
File 27 of 63      │C:\MAGELLAN\PRACTICE\UI.388  Text       Line 1 [1%]
F1──F2──F3──F4──F5──F6──F7──F8──F9──F10
Help
```

```
Lotus Magellan  Use +, - for Next, Previous Search string        UPDATE    FIND
┌─────────────────┬──────────────────────────────────────────────────────────────┐
│ 94% LAUNDRY.488 │ USER  TERFACES:   DON'T MANIPULATE; DELEGATE!                │
│ 94% PUBLISH.488 │                                                              │
│ 94% RESOURCE.488│ Direct manipulation is the user's feel  g that he's working  │
│ 94% SOFTWARE.588│    timately, rather than giv   g it commands. It's the differ│
│ 94% CALENDAR.388│ steer   g a car, and tell   g it go-left, go-right. With all │
│ 91% CASETOOL.588│ user-friendl   ess over the past few years, it is accepted th│
│ 91% HOLISTIC.488│ direct manipulation, but how then to account for cruise cont │
│ 91% MOTIVES.688 │                                                              │
│ 91% RESOURCE.288│ Wouldn't it be nice to be able to map out the car's path bef │
│ 91% RESOURCE.688│ then relax and enjoy the ride?  Or better yet, tell it where │
│ 88% CALENDAR.488│ it figure out the route itself, obeying traffic laws and tra │
│ 88% CHANNELS.288│ with unfail  g accuracy?  (Of course, we want to reta    the │
│ 88% CONTEXT.488 │ and make a detour if we see a particularly appeal  g sight i │
│ 88% DOCUMENT.488│ We're gett  g to the po  t in software where users can learn│
│ 88% FORUM.288   │ and plan routes, if we make it easy.                         │
│ 88% KAPOR.288   │                                                              │
│ 88% NUCLEUS.188 │ Half the trick in provid  g delegation-through-software is a │
│ 88% OPENSOFT.688│ the user doesn't have to bother with the details.  The other│
│ 88% SQLSERVR.188│ him power without taking away granularity of control.  He do │
│ 88% UI.388      │ software to make all the choices; he wants to be able to spe │
├─────────────────┼──────────────────────────────────────────────────────────────┤
│ File 27 of 63   │ C:\MAGELLAN\PRACTICE\UI.388  Text             Line 1  [1%]   │
├──F1────F2────F3────F4────F5────F6────F7────F8────F9────F10──┤
│ Help                                                        │
```

SEARCH AND RETRIEVAL SYSTEM

CROSS REFERENCE TO RELATED APPLICATIONS

This application is a continuation-in-part of U.S. Ser. No. 436,146 filed Nov. 13, 1989 (now abandoned), which is a continuation-in-part of U.S. Ser. No. 336,963 filed Apr. 12, 1989 (now abandoned), which is a continuation-in-part of U.S. Ser. No. 298,366 filed Jan. 18, 1989 (now abandoned).

REFERENCE TO MICROFICHE APPENDIX

The application includes a microfiche appendix pursuant to 37 CFR §1.96(b) containing 22 microfiche with 2084 frames.

BACKGROUND OF THE INVENTION

The invention relates to searching and retrieving data stored in a digital data processing system.

A storage unit in a digital data processing system, e.g. a hard disk drive in a personal computer (PC), is capable of storing great volumes of data in its files. To search the files, the central processing unit (CPU) in such a system is capable of comparing given data with the data stored in one or more files in order to locate any occurrence(s) of the given data. For example, the CPU can compare a given word or phrase to the words or phrases in a lengthy file and locate the word or phrase if it occurs in the file. Having located the given data, the CPU can then retrieve the data or provide other information regarding it, e.g., the name of the file containing the data.

The storage capacity and access speed of today's hard disk drives is increasing rapidly. At the same time the price of hard disk drives is decreasing rapidly. As a result there is a proliferation of hard disk drives installed in PCs and users of varying levels of expertise are storing more and more data on the drives. Many users, however, encounter difficulties in searching and retrieving the data they have stored. For example, users sometimes cannot remember the name of the file that contains the data they seek or even where the file is located within a maze of directories and subdirectories of files. Further, users who store vast amounts of data in files created with a growing diversity of software applications, e.g., spreadsheets, personal information managers, word processors, database managers, and electronic mail exchanges, often find that they cannot consolidate the data.

Toward managing this growing volume of data, a number of search techniques of varying scope and complexity have been devised. Some search techniques are quite literal, i.e., they search for and retrieve exactly what the user specifies. For example, given "chemical patent" a literal technique locates only occurrences of exactly those two words in that order and overlooks "patent on a chemical compound."

Other search techniques allow a user to issue a search request that contains data as well as Boolean expressions, e.g., AND, OR, or NOT, which expand the range of data retrieved. For example, given "patent AND chemical OR pharmaceutical" a search technique including Boolean expressions locates "chemical patent" as well as "pharmaceutical patent". The range of the search can be further expanded by adding variables indicating word order and proximity. For example, given "patent AND chemical WITHIN 3 WORDS" the technique locates "patent on a chemical".

Still other search techniques include a feature known as "fuzzy searching" which provides "wild card" characters, e.g., "!" and "*", that make it possible to locate variations of given data. For example, if "!" indicates one or more wild card characters, the fuzzy search technique given "chem!" locates "chemical", "chemist", and "chemistry".

SUMMARY OF THE INVENTION

The present invention is a text search and retrieval system for searching, viewing, and retrieving data in stored files created by a variety of applications. The system builds index files representing the approximate position and relative frequency of every word in every file on a given storage unit, searches for user-requested words using the index and ranks the files based on the relative strength of match with the search request. From a display of the ranked filenames, preferably indicating the relative ranking in respective percentages, the user can then select a file, whereupon the file is tested to determine which one of a plurality of file viewers to deploy. The closest corresponding viewer is automatically loaded and used to display consecutive screens of information from the selected file. Further searching within the file itself is accomplished within the context of the viewer by, for example, matching character strings of a new search request with characters of words in the items of the file produced by the viewer.

To work on a file in view, the user can invoke the software application which created the file by loading the application corresponding to the viewer along with the desired file, without abandoning the search system.

Invocation of the proper viewer is based on a bidding system in which each viewer for a given application assesses its own fitness and contends for viewing rights by examining the file extension and a portion of the subject file and then generating a compliance rating. The top rated viewer is automatically loaded to produce items, e.g., lines or cells, which are displayed screen-by-screen, preferably in a window of the display to one side of the filename listing.

The index preferably comprises distinct word records including a unique digital representation of the corresponding word, along with one or more file records including a file code identifying the file, a density field indicating the relative frequency of the word in the file and a position field indicating the approximate location within the file, preferably by file segments of varying size depending on the number of occurrences of the word in the file. Where two or more words are present in the search request, the rating is based in part on a combination of their density fields and on whether the words appear in the same approximate location in the file based on their position fields.

These and other features and advantages of the present invention will be apparent from the following description of a presently preferred embodiment and from the claims.

DESCRIPTION OF THE PREFERRED EMBODIMENT

FIG. 6 is a table of word endings used by the search system to conduct searches on word variants.

FIG. 8 is a pictorial representation of a screen display that shows a list of files and a view of one of the files resulting from a primary search.

FIG. 9 is a pictorial representation of a screen display that shows a view of one the same file as in FIG. 8 resulting from a secondary search.

FIG. 10 is a pictorial representation of a screen display that shows a view of the same file as in FIG. 8 resulting from a continuation of the secondary search.

GENERAL DESCRIPTION OF THE SEARCH AND RETRIEVAL SYSTEM

Figure 1:
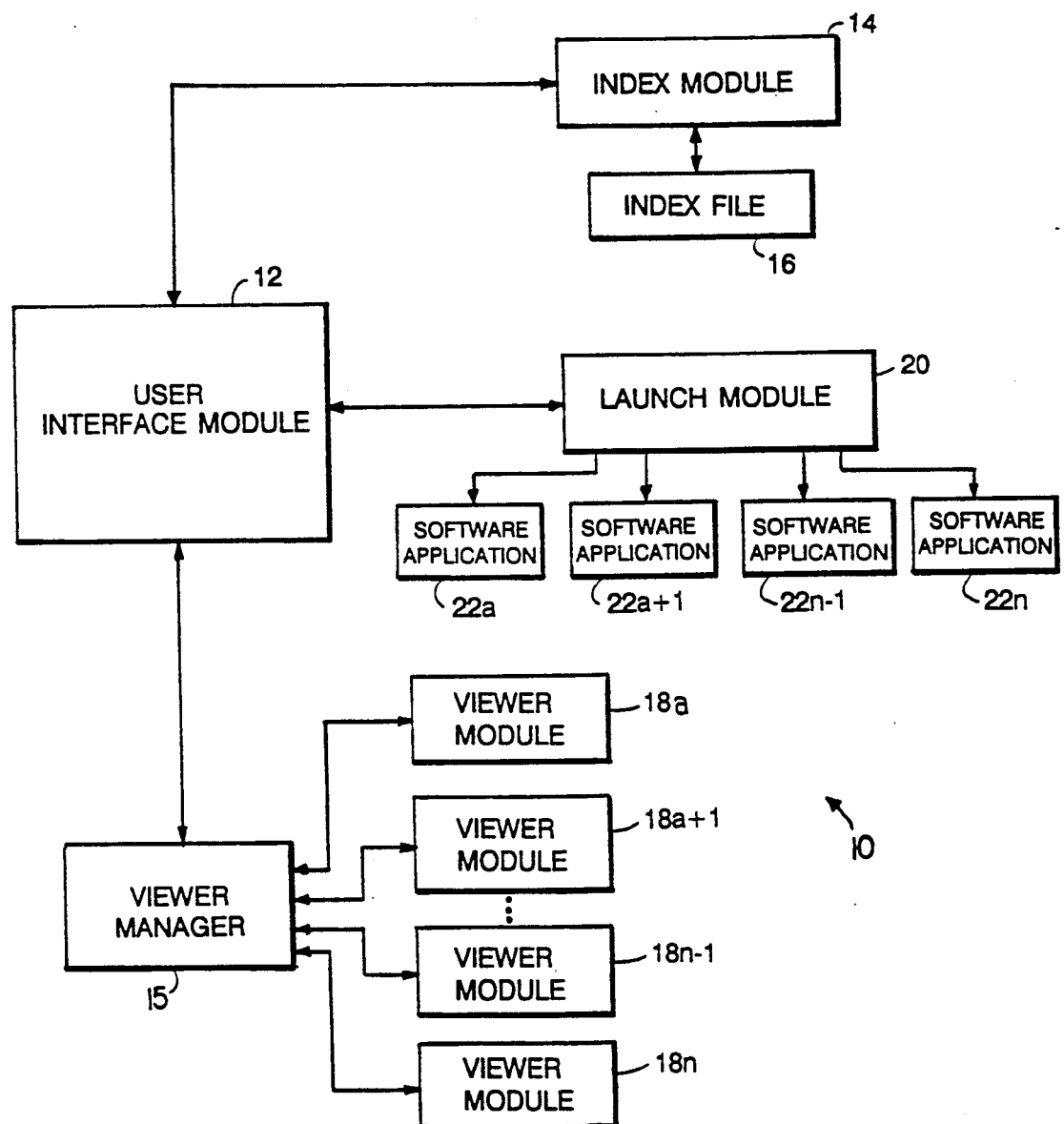
FIG. 1 is a block diagram of a text search and retrieval system of the present invention.

Referring to FIG. 1, a search and retrieval system 10, includes an interface module 12 which coordinates the actions between a user and other modules in the system. In one aspect of the invention, i.e., indexing the files of a hard disk drive, the interface module 12 is connected to an index module 14. The index module 14 creates or updates an index file 16 which contains an encoded version of every word in every file (referred to herein as "data files" to distinguish them from the "index file"). The first time a user invokes the system 10, the index module 14 creates and stores the index file 16. Thereafter, each time the user invokes the system 10, the index module 14 updates the index file 16 already in existence to account for any data files that the user has added, modified, or deleted since the last time the system was invoked. A detailed description of the capability of the index module 14 to create and update the index file 16 is provided below in connection with FIGS. 4-6.

In a second aspect of the indexing feature, the interface module 12 is connected to a viewer manager 15 which is in turn connected to viewer modules 18a-18n. One task of the viewer modules 18a-18n is to provide data to the index module 14 necessary to create the index file 16. That is, a viewer module 18 reads a data file, divides the data file into words, and passes the words to the index module 14 so that the index module can encode the words and create the index file 16.

To process a data file in the above way, the viewer manager 15 reads the first portion of the data file and the viewer modules 18a-18n "bid" on the data file to determine which viewer module is the appropriate viewer module for the data file. Note that just as there are different types of data files, e.g., worksheet files, text files, and database files, there are different types of viewer modules. Thus, each viewer module 18 corresponds to a type of data file. For example, a viewer module 18 can correspond to a file created by a particular application, e.g., Lotus 1-2-3 ®, Manuscript ®, or Agenda ®. A viewer module can also correspond to a data format, e.g., ASCII, hexadecimal, or binary.

Once the index file 16 is created or updated, the interface module 12 accesses the index file to carry out user issued primary search requests on the data files. That is, a user issues a primary search request to locate given data, e.g., "financial report", in data files on a specified "path" of the hard disk drive. The path specifies certain directories, subdirectories, and files. For example the path can specify all data files on a particular hard disk drive, e.g., "C:", or all data files in one or more sub-directories, e.g., "C: ACCOUNTS FY_1989 ". The path can also specify all data files created by a particular software application, e.g., all Lotus 1-2-3 ® data files or all Manuscript ® data files.

In response to a primary search request, the index module 14 locates all occurrences of the given data in the index file 16. The occurrences of the data in the index file are linked to occurrences of the data in the data files on the specified path (as described in detail below in connection with FIGS. 4 and 5). Thus, the index module 14 is able to produce a list of data files that contain the given data.

Figure 2:
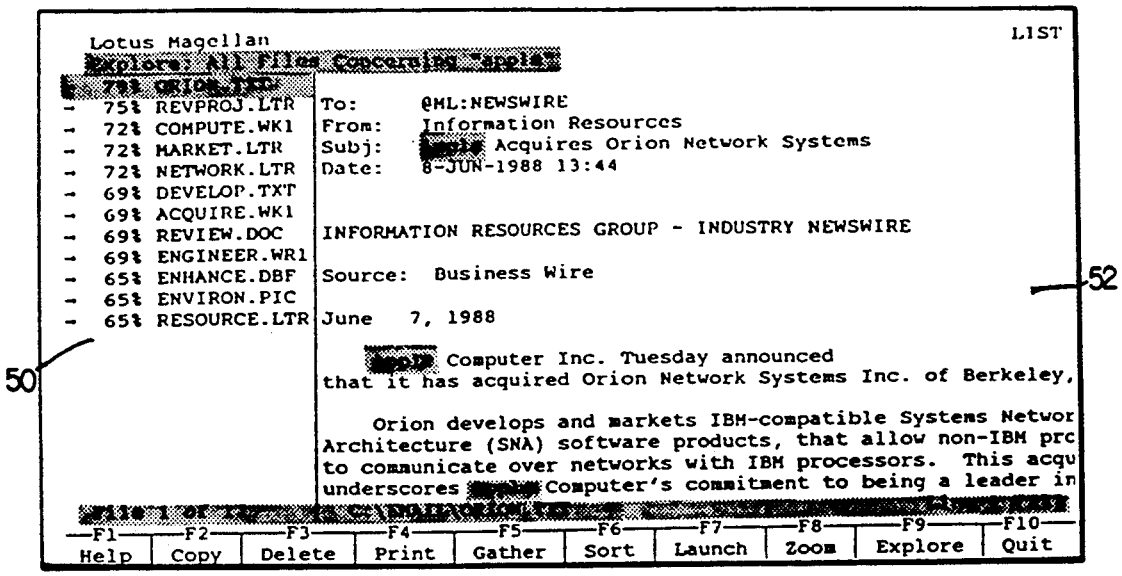
FIG. 2 is a pictorial representation of a search screen display that shows a list of files located in a primary search and a view of one of the files.

Referring again to FIG. 1, in addition to providing data to the index module 14, the viewer modules 22a-n also display data files, e.g. as shown in FIG. 2 and discussed in detail below. As noted above, each viewer module 18 corresponds to a type of data file. Thus, a viewer module 18 that corresponds to a software application, e.g., Lotus 1-2-3 ®, displays a data file as the corresponding software application would display the data file. Similarly, a viewer module that corresponds to a data format, e.g., ASCII, displays a data file in the corresponding data format.

In addition, one or more of the viewer modules 18a-18n is capable of displaying a given data file from the list of data files that results from a primary search request. However, one viewer module is usually preferable to another. For example, both the 1-2-3 viewer module and the ASCII viewer module can display a 1-2-3 file, but the 1-2-3 viewer module is to be preferred over the ASCII viewer module. A detailed description of the capability of a viewer module 18 to "bid" for the opportunity to display a particular data file is provided later in connection with the detailed description of viewing.

And finally, the viewer modules 22a-n provide means to perform a secondary search request within a displayed data file a description of which is provided later in connection with the description of viewing a data file. First, an example of a primary search is provided.

Referring to FIG. 2, the user has issued a primary search request, i.e., "Explore all files concerning 'Apple'". Having located the given data in the index file 6, the interface module 12 displays a list of data files 50 containing the words in the request on the left side of the computer screen. In this particular example, twelve data files contained "Apple" and are listed in order of percentage match. The right side of the screen 52 simultaneously displays the contents of the selected data file, i.e., "ORION.TXT", which the user has highlighted in list 50. (Note that specific occurrences of "apple" in "ORION.TXT" are highlighted as well.) At this point, if the user wanted to work with the displayed data file, he could "launch" into the application that created the file. A description of the launch feature is provided next.

Referring again to FIG. 1, the interface module 12 is also connected to a launch module 18 which contains a listing of the keystrokes necessary to invoke or "launch" any of the software applications stored on the PC's hard disk drive(s), i.e., one of software applications 20a-n, and load a selected data file. A user usually launches into an application after performing a primary search or secondary and while viewing a data file with which he wants to work. A detailed description of the capability of the launch module 20 to invoke an application and load a data file is provided later in connection with launching from a data file.

Figure 3:
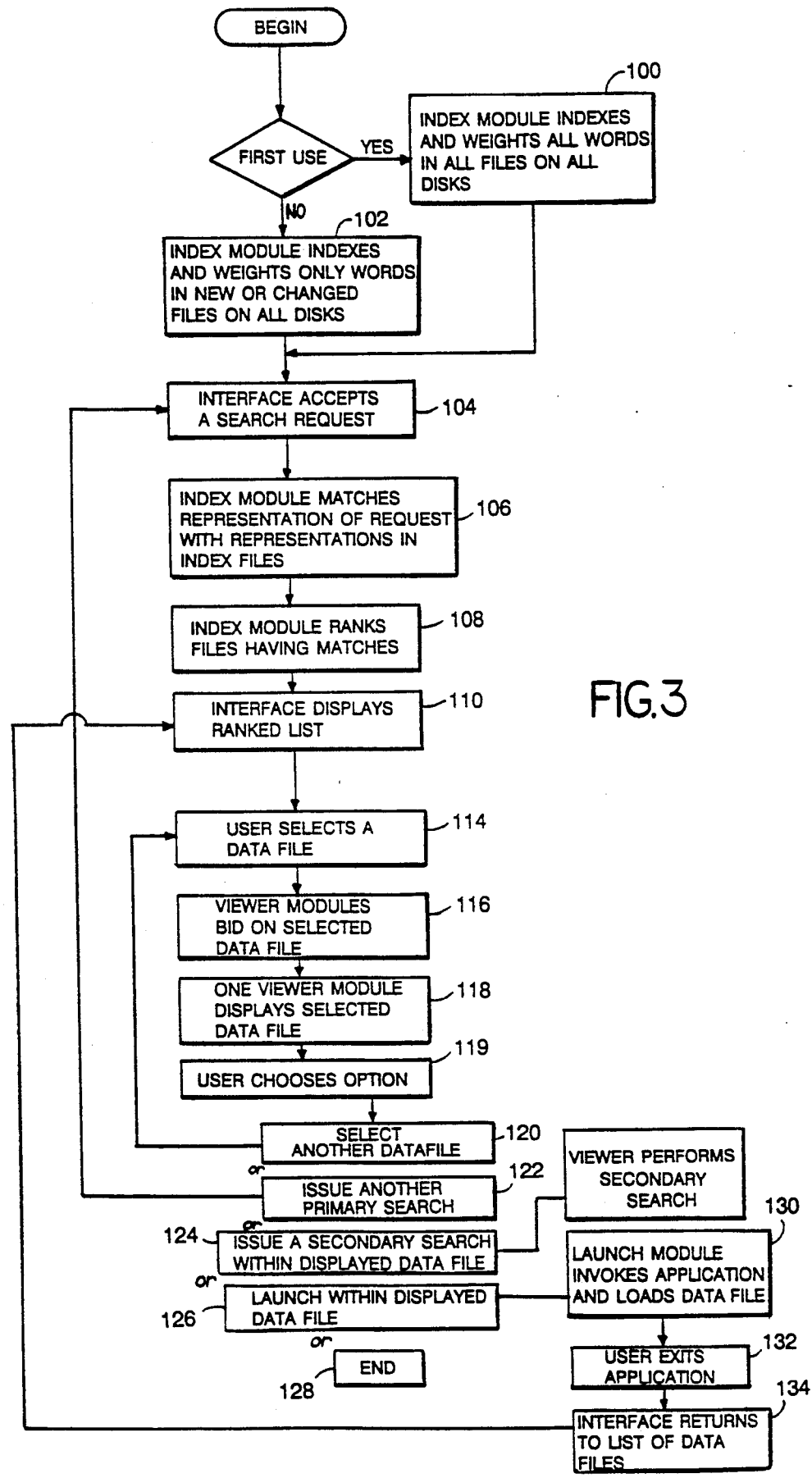
FIG. 3 is a flowchart illustrating operation of the text search and retrieval system of FIG. 1.

Referring to FIG. 3, the general operation of the interface module 12, the index module 14, the viewer manager 15, the viewer modules 18a-18n, and the launch module 20 shown in FIG. 1 are discussed in flow chart form. Beginning in step 100, the first time the system 10 is invoked, the index module 14 indexes and weights all words in all data files stored on each hard disk drive. If, however, the data files have previously been indexed, the index module 14 updates existing index files (step 102).

Next, in step 104, the interface module 12 accepts a search request and path from a user and passes the request to the index module 14. In response, the index module 14 indexes all of the words in the search request and checks the index files 16a-n for occurrences of the indexed words (step 106). If an occurrence is found and it is contained in a data file found on the path, the index module returns the name of the data file and a ranking which is calculated based on the weight of the indexed word(s) in the in data file (step 108). The interface module receives the list of data files and rankings and displays them in a list of data files (step 110).

Once the list of data files is displayed, the user can scroll through the list by moving a cursor up or down the list of data files, selecting various ones (step 114). When the user selects a data file, the viewers 18a-n bid on the data file (step 116) and one viewer 18 displays the data file (step 118). While the data file is displayed, the user can choose from a number of steps. The user can select another data file (step 120), issue a primary search (step 122), issue a secondary search (step 124), launch the software application that created the displayed data file (step 126), or end (step 128), i.e., exit the system 10 altogether. In step 124, if the user issues a secondary search, the receiver module performs the search (step 125), and returns to step 119 to allow the user to choose another option.

In step 126, if the user chooses to launch, the launch module 18 invokes the software application 22 which created the file provided, of course, the application which created the data file is one of the applications 20a-n (step 130). Once the user exits the software application (step 132), the interface module 12 again displays the list of data files (step 134), returning the system 10 to the state in which the user left it.

INDEXING DATA FILES

The first step taken by the system 10 of FIG. 1 is indexing the data files on the hard disk drive(s) of a PC. The first time the interface module 12 invokes the index module 14, it indexes all of the words in all of the data files stored on the PC's hard disk drive(s), creates the index file 16 for each hard disk, and stores the index file on the hard disk drive for future reference. Creating a new index can take some time (10 to 20 minutes). Subsequent invocations of the index module 14, however, cause it to index only the new and changed data files on the hard disk drive(s) and update the existing index file 16, thus saving the user an unnecessary wait.

The first step taken by the index module 14 in creating the index files 16 is to create a random four byte hash code for every word in every data file. The index module 14 does this by converting each word into a very large integer based on the ASCII value for each character in the word and converting the result into a binary representation. Then, using a large prime number, 31 bits long, the index module 14 does a table lookup operation to take the modulus of the very large binary integer, and uses the resulting 31 bit modulus as a nearly unique and random hash code to represent the word. Note: the word itself is not stored in the index, which reduces the size of index files 16.

Figure 4:
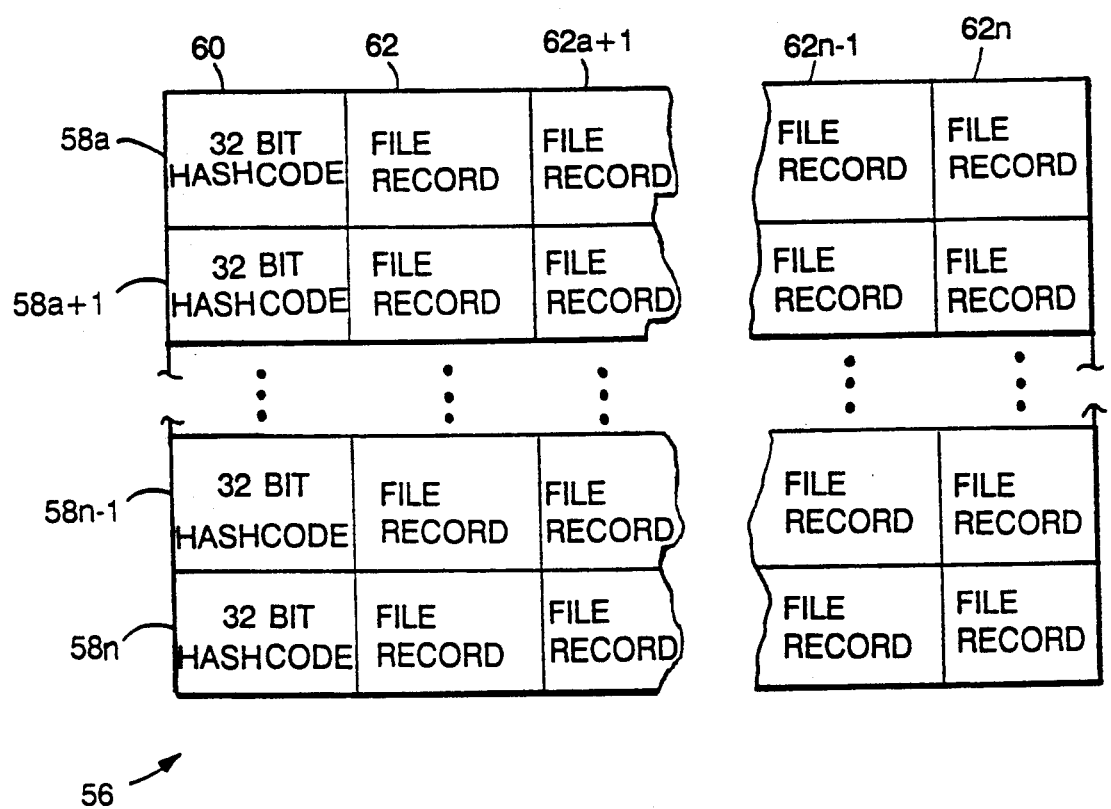
FIG. 4 is a block diagram of an index structure.
Figure 5:
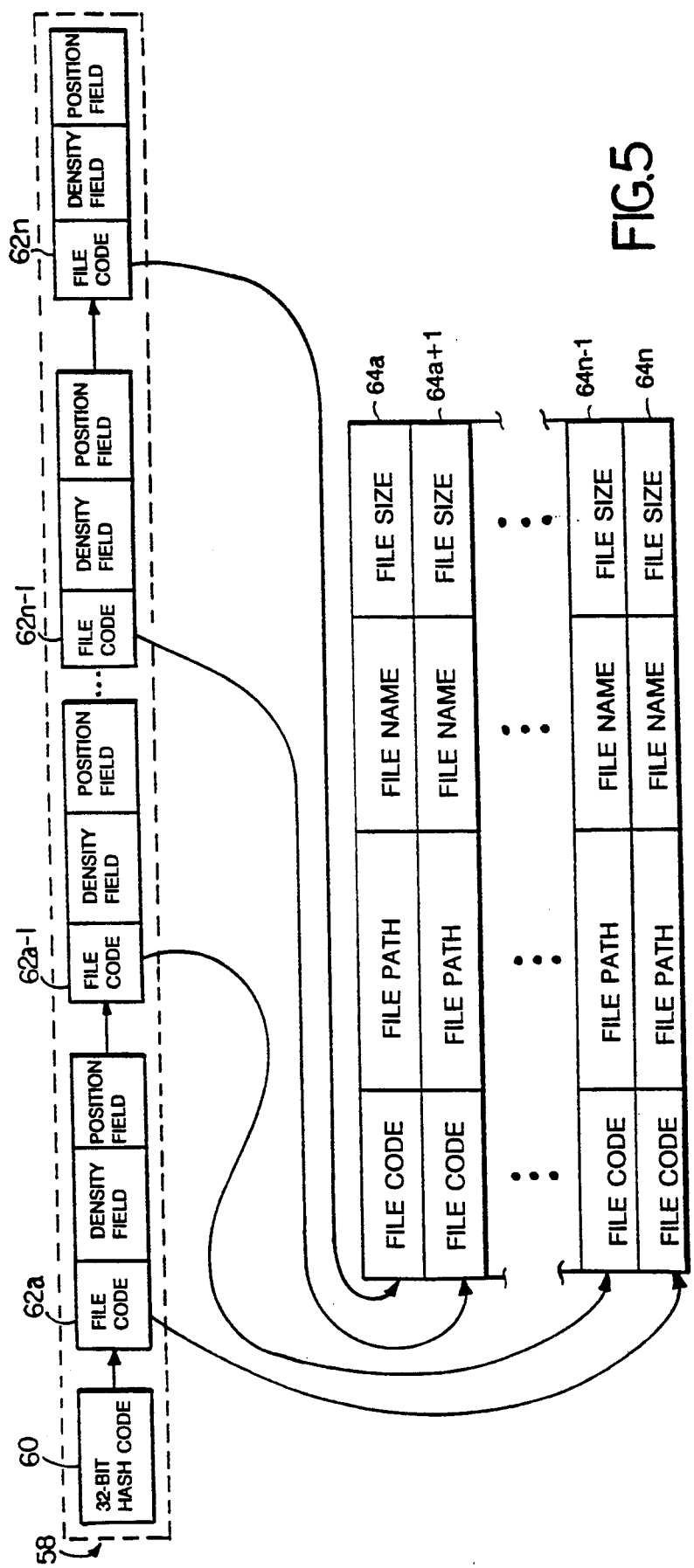
FIG. 5 is a block diagram of a word and file records within the index structure.

Referring to FIG. 4, an index structure 56 includes word records 58a-n. Each of the word records 58a-n includes a 32 bit random hash code 60. The high order 12 bits of the hash codes 60 define the specific area of one of the index file 16 where a word represented by the entire hash code 60 appears. All of the words whose hash codes have the same first 12 bits fall into the same section of an index file. Since the high hash value splits the index files 16a-n into approximately 16,000 sections, there are typically very few words in a section. For example, a data file having 32,000 words puts only 2 words in each section. Then, within a given section of the index, the high order bits represent a given word. A plurality of file records 62a-n are linked to each of the 32 bit hash codes 60. Fields in the file records 62a-n then indicate occurrences of the represented word in various data files on the hard disk drive.

Referring to FIG. 5, again each of the word records 58a-n is linked to the file records 62a-n. Each of the file records 62a-n contains a plurality of fields including file code, density field, and position field. The file code field is a pointer to one of a plurality of file identifier records 64a-n in a file list 70. The fields of the file identifier records 64a-n contain various file information including: file code, file path, file name, and file size. Further, each of the file records 62a-n contains a density field (4 bits) called a strength weight and a position field (8-bits) called a proximity weight.

The 4 bit strength weight is a value between 0 and 15 (centering around 8) and indicates the relative "strength" of a word in a file. The strength of a word is determined as follows. First, the number of occurrences of the word in the data file is divided by the number of words in the data file and provides a result (a). Next, the number occurrences of the word in all indexed data files is divided by the number of words in all indexed data files and provides a result (b). Finally, the result of the first division (a) is divided by the result of the second division (b) and provides the strength weight for the word.

Each file record 62a-n is also assigned an 8-bit proximity weight to help determine the position of the word represented by its associated 32 bit hash code 60. If there is more than one word in a search request, the proximity weight field also determines how close one word occurs to another. In the first case, where there is only one word in the search request, the proximity weight reflects the position of the word to within 1/256 of the word's position in the data file. When there are two words, two 4 bit codes are used to represent which 1/16 of the data file the respective word occurrences are in. Otherwise, when there are more than two occurrences of a word, each of the 8 bits represents one eighth, or one section, of the data file, i.e., if the word occurs within a section, the bit for that section is set. For example, if a word occurs in the second, third, and seventh sections, bits 2, 3, and 7 are set.

Once the index module 14 has indexed and weighted each word in each data file, the interface module 12 can accept a primary search request from the user. Given the primary search request, the index module 14 converts the words in the primary search request to hash codes, using the same method used above to convert words in the data files. Next, the index module 14 matches the 32 bit hash code representations of the words in the primary search request with the 32 bit hash code representations 60 in the index file 16.

Referring to FIG. 6, if the index module 14 encounters a word in the search request which has one of the "original word endings", the index module first converts and searches for the exact word, and then removes the ending of the exact word, replaces it with all the "associated endings" or variant words, converts the variant word to a hash code, and searches for the variant word as well. For example, if the exact Word is "fake", the search index module 14 also finds variant words "fakes", "faked", and "faker".

Note: Upper and lower case letters in search strings are treated the same, while numbers are split into groups of three digits, non-overlapping. In this way, the index grows by a maximum of 999 entries for any combination of numbers.

As discussed in detail above, the index module 14 stores in the word records 58a-n the weight of a word according to the number of occurrences of the word in the data file (4-bit strength weight), the proximity of these occurrences to other occurrences (8-bit proximity weight), and the number of actual occurrences of the word (exact matches). When the interface module 14 performs a primary search request, it sums these weights and ranks the data files according to their total weight.

Recall that the four bit strength weight is divided by the total number of words in the data file and also divided by the number of occurrences of the word across all of the data files in the index. A word that occurs many times in a large data file, therefore, has more strength and is given more weight than a word that occurs only once in a large data file. Similarly, if a word occurs one time in each of two data files, the occurrence in the smaller data file is stronger and weighted more heavily. Strength weight also considers how often a word occurs across all of the data files indexed and weights common words such as "the" less heavily than unique words such as "applesauce."

In addition, the final weighting for an exact match depends on how many words are in the primary search request. For example, if there is one word in the primary search request and it appears in the data file exactly as it appears in the request, the word is weighted as an exact match. Two rules govern granting an exact match weighting to occurrences of two search words: 1) If both words occur only once within the same 1/256 of a data file, they are in proximity and are weighted with an exact match; 2) If both words occur more than once and both occur within the same ⅛ section of a data file or in adjacent ⅛ sections of a data file, they are in proximity and are weighted with an exact match.

When a primary search request has more than two words, the interface module 12 links together all of the 32 bit hash codes that match a representation of one of the words in the request. The interface module 12 then reviews the linked 32 bit hash codes and gives greater weight to a data file if its associated file record is linked to more than one of the linked 32 bit hash codes, i.e., a data file containing many of the words of a primary search request is deemed more relevant to the primary search request than a data file containing only a few of the words in the primary search request.

Once the index module 14 searches the index file 16 and sums the weights of each occurrence of a word also found in the primary search request, the index module ranks the data files which contain matches to the primary search request. For a primary search request with one word, the data file ranked highest is the one where the number of exact matches in the data file divided by the number of words in the data file is the greatest. Other data files with exact matches are ranked as a percentage of the highest ranked data file. Also, for weighting purposes, data files having variant and exact matches are ranked with 50% of the weight of data files having exact matches only. Data files having no exact matches, only variant matches, are ranked lowest.

After a primary search is complete and the relevant data files are ranked, the interface module 12 lists the data files in descending order of weight. A user-defined weight threshold determines when a data file's weight makes it worth listing, e.g., the default threshold is 20%. Note, however, that it is possible for data files that have many variant matches to outweigh data files with only a few exact matches. Therefore, the percentage ranks can appear out of order. However, most of the time, the percentage decay is quite smooth. A detailed description of the viewer modules, which display files from the list of data files, is provided next.

VIEWING A DATA FILE

The essential purpose of the viewer is to take application-specific data items, e.g., text, records, or cells, and produce application-independent data items. For example, a Manuscript data file is application-specific data which is represented as a list of items, i.e., lines of text, each of which has an unique item identification. Alternatively, an item can be a cell, e.g., as in 1-2-3 ® files, or a field, e.g., as in database files. One advantage of this approach is that a number of application-specific viewer modules are able to operate independently of the interface module. Thus, it is possible to add more viewer modules without changing the interface module. A detailed description of the user's selection of data files and the operation of the viewer modules is provided next.

Once the interface module 12 (FIG. 1) displays a list of data files, the user can select one or more of the data files. Such a selection causes the interface module 12 to call the viewer manager 15. In response to the call from interface module 12, the viewer manager 15 reads in a portion of the selected data file, e.g., the first 1,000 bytes, from the hard disk and calls each viewer module 18 to bid on the data file.

In determining its bid, each viewer module 18 first examines the file extension of the data file, i.e. the characters following the period delimiter in the filename such as "WKS" for a 1-2-3 worksheet or "AGA" for an Agenda file. Next, each viewer module 18 examines the portion of the data file read in previously by the viewer manager 15. On the basis of these examinations, each viewer 18 decides if it can display the data file, cannot display the data file, or may be able to display the data file.

As noted in connection with FIG. 1 at least one viewer module 18 is capable of displaying the file. Therefore, each viewer module 18 bids according to the degree of its capability and the capable viewers are ranked according to their bids. For example, given a 1-2-3 ® data file, a 1-2-3 ® viewer offers the highest bid, a Symphony ® viewer offers a slightly lower bid, a binary viewer (which can display any data file) offers the second lowest bid, and the remaining viewers (which are not able to display the data file at all) offer the lowest possible bid. In cases in which more than one viewer module 18 is capable of displaying a data file, the system 10 allows the user to cycle through all of the capable viewer modules and display the selected file in various formats.

Figure 7:
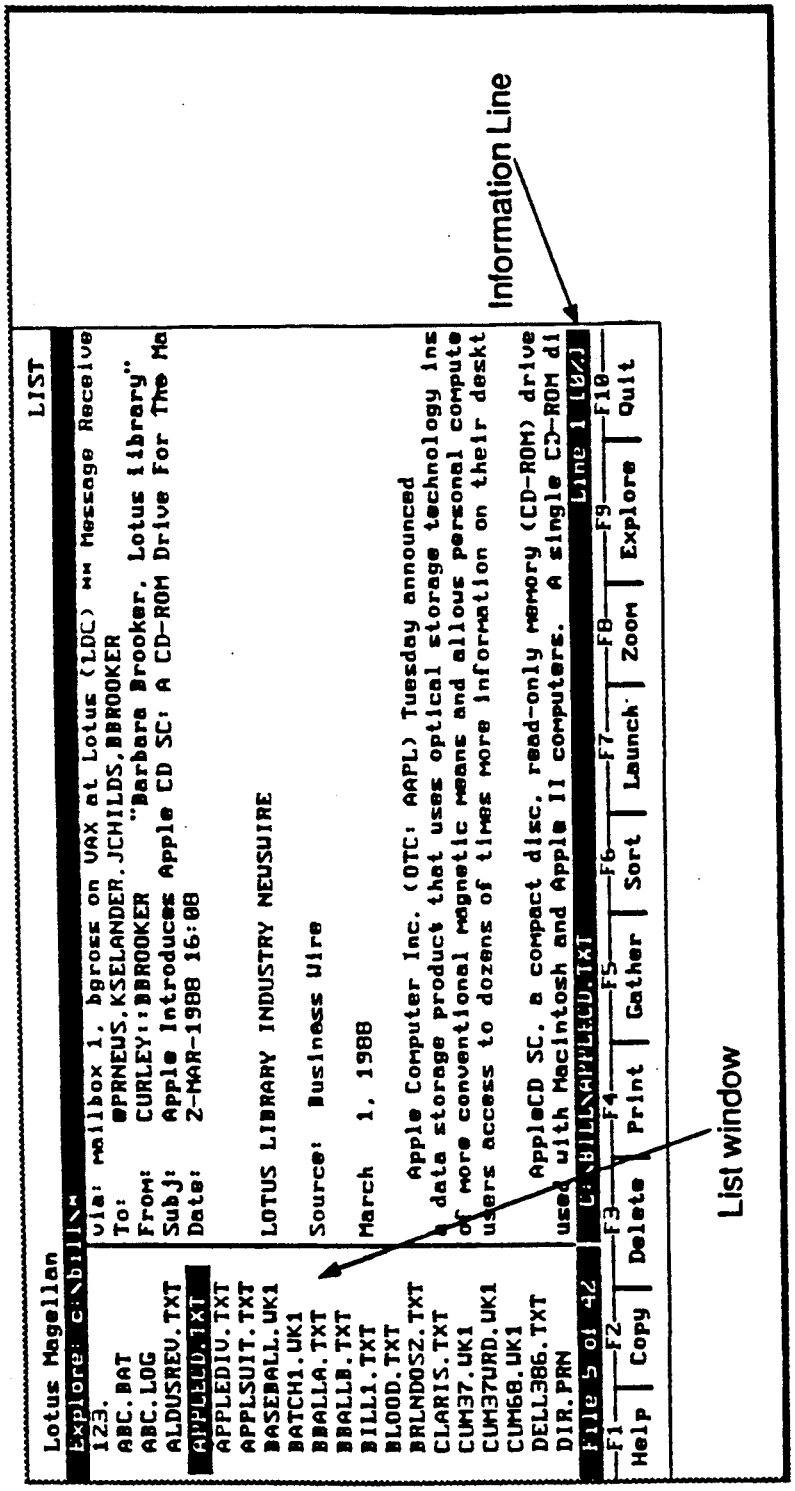
FIG. 7 is a pictorial representation of a screen display that shows a list of files and a view of one of the files resulting from a primary search.

Referring to FIG. 7, the arrangement of the computer screen display is central to the user's perception of the operation of the viewer modules 18. The screen display is divided by a vertical line splitting the screen into two side-by-side windows. In the left window (the list window) is a list of the data files specified in the primary search request, i.e., all files in the "c: bill " subdirectory. In the right window (the view window) is the text, numbers, words, letters, etc. found in the data file highlighted in the list window, i.e., "APPLECD.TXT". (Note that because FIG. 7 shows all data files in a path and is not limited by a specific primary search request, there are no percentages associated with the data files in the list window.) At this point, the user can select one data file at a time from the list of data files.

As the user highlights each of the data files in the list window, various viewer modules are invoked and the corresponding view in the view window changes. By moving the cursor, preferably an arrow, across the vertical partition into the view window, a user can also scroll though the text of the data file while the filename remains highlighted in the list window. As the user scrolls forward or backward through the text, the viewer manager 15 reads in succeeding or preceding portions of the data file into a number of buffers, each of which holds a portion of the data file, e.g., enough of the data file to fill one screen. This buffer approach provides a fast response time if a user scrolls through a portion of the data file he has previously and recently scrolled through. While scrolling through the text of a data file in the view window, the user can issue a secondary search request as described next.

Referring to FIG. 8, once the user has established a view, e.g., by issuing the primary search request "Drive C, all files concerning 'software'", he can perform a secondary search. Referring to FIG. 9, the user issues a secondary search by entering a second search string incrementally, i.e., one character at a time. In response to each character of the second search string, the active viewer module 18 provides the viewer manager 15 with a series of data items from the data file, e.g., lines of text or database records. The viewer manager 15 passes each item to the interface module 12 which locates and highlights all occurrences of the search string in each of the items it receives.

For example, referring to FIG. 9, the user has entered "i" and all occurrences of "i" in the displayed data file, i.e., "UI.388" are highlighted. Note that the system locates all occurrences of the search string, at the beginning of a word, e.g., "Interface", or within a word, e.g. "Direct".

Referring to FIG. 10, the secondary search of FIG. 9 is continued as the user types additional characters which the system appends to the current search string, locates in the data file, and highlights in the display. For example, the user has typed "n" and all occurrences of "in" in the displayed data file are highlighted. Note that occurrences of "i" that are not followed by an "n" are not highlighted. The user can continue to add or delete characters from the search string and the viewer locates each amended search string as illustrated below.

Figure 11:
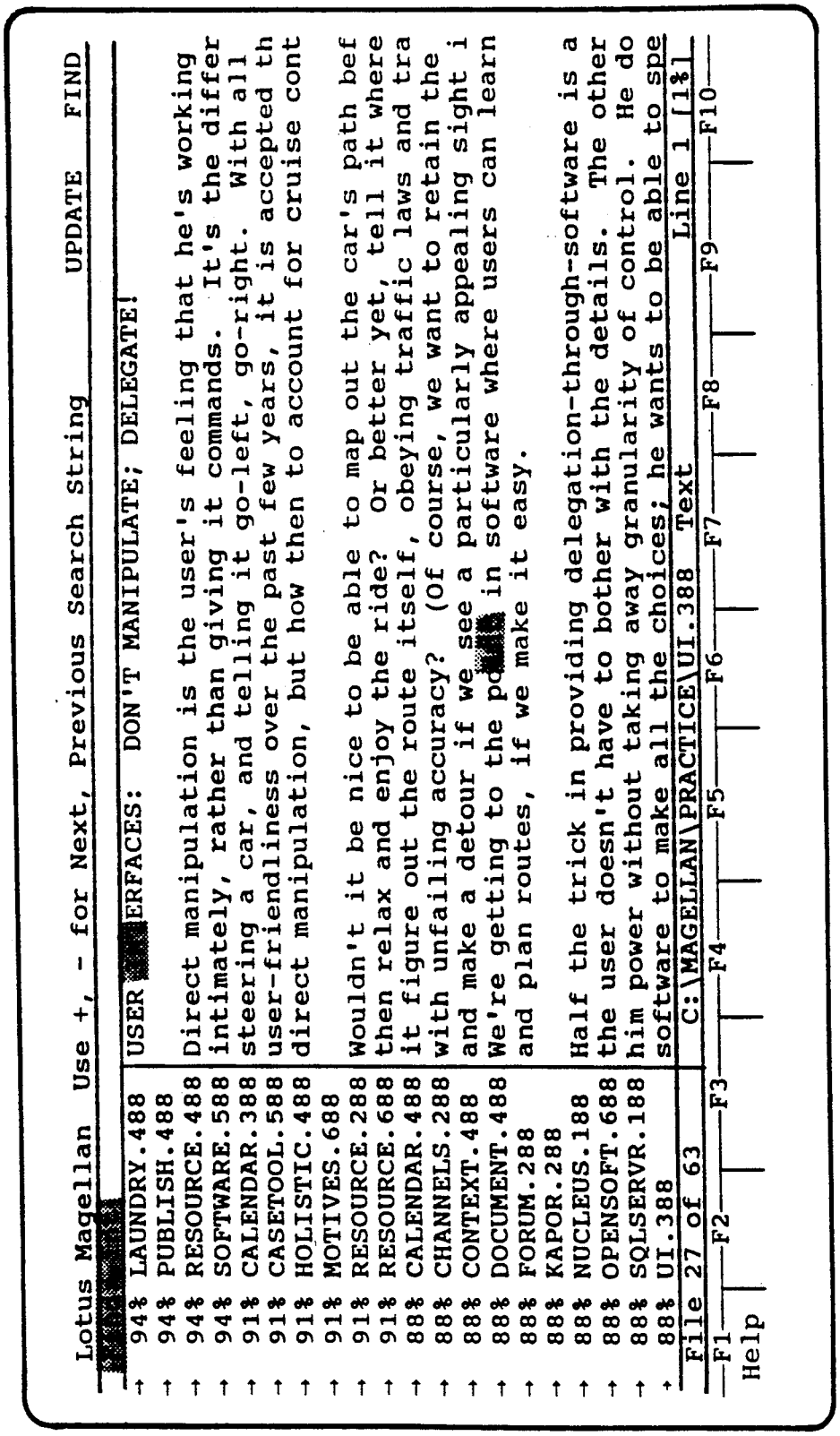
FIG. 11 is a pictorial representation of a screen display that shows a view of the same file as in FIG. 8 resulting from a further continuation of the secondary search.

Referring to FIG. 11, the secondary search of FIG. 10 is continued. The user has typed "t" and all occurrences of "int" are highlighted. It is important to note at this point that the user is not required to initiate a new secondary search operation each time he amends the search string. The secondary search is carried out dynamically as the user types the string and the highlighted occurrences of the search string change to correspond to changes in the search string. In an alternative embodiment of the secondary search described above, the displayed data file is "collapsed" and "expanded" as described next.

A technique used in a viewer module 18 comprising an alternate embodiment of the secondary search optimizes the secondary search by associating a tag bit with each item. These tag bits are set when an item contains an occurrence of the search string and are cleared when an item does not contain an occurrence of the string. The tag bits are used to alter the display of the data file as the search proceeds, i.e., the display of the file "collapses" so that only those items that contain a match of the current search string are displayed. One advantage of this approach is that the user's attention is directed to only those items that contain the search string.

In this alternative approach, as each search is carried out, the number of items displayed changes. In particular, if the user appends characters to the search string, the number of items displayed is reduced since the specificity of the search is increased. The tag bit for each item is set or cleared depending on whether the item contains an occurrence of the search string, and indicates whether the item should be displayed or not. Thus, the time and effort needed to carry out the search is reduced. If on the other hand, the user deletes characters from the search string, it is not possible to use the tag bits to optimize the search.

The collapsed display feature is useful, for example, as an outlining technique. One advantage of this feature is that it does not require the user to predefine particular words, e.g., keywords, or words in particular situations, e.g., single lines of text that denote headings. Instead, the viewer creates an outlined version of the file based on any search string and any range of text around that search string.

Another feature of the alternative secondary search is that the collapsed view can be expanded. Using standard navigation commands, e.g., the up, down, left, and right arrow keys, the user can move to any of the lines in the collapsed view and expand the line to see the search string in the context of its surroundings. Further, the user can toggle back and forth between the collapsed and expanded views, e.g., by pressing the return key, without having to reenter the search string.

LAUNCHING FROM A DATA FILE

Having displayed a list of data files that contain the words of the primary search request and allowed users to view a data file and perform secondary searches within the data file, the system 10 also allows users to launch the software application that created the data file. The launch module 20 stores all of the keystrokes needed to invoke each of the applications 22a-22n. To launch an application 22 and load a highlighted data file, the launch module 20 passes the necessary keystrokes to the operating system of the PC, e.g., DOS ®, and passes the highlighted data file's path and filename to the application 22, e.g., Manuscript ®. Next, the search system 10 releases all but a small amount of the RAM memory it is using——retaining only enough to keep track of where the search left off. In this way, users do not abandon the search system 10 and are able to return when they exit the application 22.

The present invention is embodied in a software application produced by Lotus Development Corporation of Cambridge, Mass. The software application, namely *Lotus Magellan*, and its user documentation, namely *Quick Launch, Idea Book*, and *Explorer's Guide* (all ©1989 Lotus Development Corporation), are incorporated herein by reference. Magellan runs on the IBM ® Personal Computer or certified compatible or IBM PS/2 ® series computer having a hard disk drive, a 3½" or 5¼" floppy disk drive, at least 512K RAM, and operating under MS-DOS ®, version 2.1 or higher. The source code that embodies Magellan is attached as an appendix and is also incorporated herein by reference. (Directory listings are provided with the source code which indicate divisions of the source code by program modules.) The programming language used is Microsoft C compiled with Microsoft C compiler version 5.10 and Microsoft MacroAssembler version 5.10. The linker used is Microsoft Overlay Linker 3.65.

Portions of this disclosure contain material which is subject to copyright protection (e.g., the source code ©1988, 1989 Lotus Development Corporation). The copyright owner has no objection to the facsimile reproduction by anyone of the patent document or disclosure, as it appears in the Patent and Trademark Office patent file or records, but reserves all other copyright rights.

Other embodiments are within the following claims.

I claim:

1. A text search and retrieval system, comprising:
   (a) an index module connected to a plurality of stored files comprising means for generating an index file the contents of which are representative of the contents of said stored files;
   (b) an interface module connected to said index file comprising means for accepting a search request from a user and applying said search request to said index file to determine a list of stored files the contents of which satisfy said search request;
   (c) a viewer module connected to said interface module comprising means for simultaneously displaying said list of stored files and the contents of a particular stored file which the user has selected from said list of stored files;
   (d) a launch module connected to said viewer module comprising means for invoking a software application appropriate for manipulating said particular stored file being displayed by said view module; and
   (e) means for displaying the contents of the selected stored file in a variable format appropriate to the application which created said particular selected stored file without, however, actually loading and running the application.

2. The system of claim 1, wherein said viewer module includes at least one viewer for displaying a selected stored file for a word processing document in a format simulating that of a document created by the corresponding word processing program, and at least one additional viewer for displaying a selected stored file for a spreadsheet in a format simulating that of a spreadsheet created by the corresponding application.

3. A text search and retrieval system, comprising:
   (a) an index module connected to a plurality of stored files comprising means for generating an index file the contents of which are representative of the contents of said stored files;
   (b) an interface module connected to said index file comprising means for accepting a search request from a user and applying said search request to said index file to determine a list of stored files the contents of which satisfy said search request;
   (c) a viewer module connected to said interface module comprising means for simultaneously displaying said list of stored files and the contents of a particular stored file which the user has selected from said list of stored files;
   (d) a launch module connected to said viewer module comprising means for invoking a software application appropriate for manipulating said particular stored file being displayed by said view module; and
   (e) said viewer module has means for establishing two distinct dedicated areas of a display providing a filename list area and a file contents display area and for simultaneously displaying the list of stored filenames returned by the interface module in the list area and the contents of a particular selected stored file which the user has chosen from said list of stored files in the contents display area.

4. A text search and retrieval system, comprising:
   (a) an index module connected to a plurality of stored files comprising means for generating an index file the contents of which are representative of the contents of said stored files;
   (b) an interface module connected to said index file comprising means for accepting a search request from a user and applying said search request to said index file to determine a list of stored files the contents of which satisfy said search request;
   (c) a viewer module connected to said interface module comprising means for simultaneously displaying said list of stored files and the contents of a particular stored file which the user has selected from said list of stored files;
   (d) a launch module connected to said viewer module comprising means for invoking a software application appropriate for manipulating said particular stored file being displayed by said view module; and
   (e) said launch module has means for automatically loading and running the application which created the particular selected stored file and opening the selected file within the application, all in response to a single nonspecific launch command from the user.

5. A text search and retrieval system, comprising:
   (a) an index module connected to a plurality of stored files comprising means for generating an index file the contents of which are representative of the contents of said stored files;

(b) an interface module connected to said index file comprising means for accepting a search request from a user and applying said search request to said index file to determine a list of stored files the contents of which satisfy said search request; and (c) a viewer module connected to said interface module comprising means for establishing two distinct dedicated areas of a display screen providing a filename list area an a file contents display area and for simultaneously displaying the list of stored files determined by the interface module in the list area and the contents of a particular selected stored file which the user has meanwhile chosen from said list of stored files in the contents display area of the same display screen.

6. The system of claim 5, wherein said viewer module comprises means for displaying the contents of the selected stored file in a variable format appropriate to the application which created said particular selected stored file without, however, actually loading and running the application.

7. The system of claim 6, wherein said viewer module includes at least one viewer for displaying a particular selected stored file which happens to be a word processing document in a format simulating that of a document created by the corresponding word processing program, and at least one additional viewer for displaying a selected stored file which happens to be a spreadsheet file in a format simulating that of a spreadsheet created by the corresponding application.

8. A process of indexing, searching and displaying on a computer screen the contents of stored files in a specified storage volume made by a plurality of different software applications, comprising the steps of creating a word index representing the contents of each of the stored files in the specified storage volume and storing the index in a specified storage area prior to exiting said process for use in a subsequent initiation of said process, accepting a user search request comprising words and applying said user search request to said index, analyzing said word index relative to said search request and returning and displaying on said screen a list of filenames among those in the specified storage volume at least partially satisfying said search request, responsive to a user selection of a filename from said list corresponding to a particular selected stored file, selecting from a plurality of candidate viewers a single viewer best capable of displaying the corresponding selected file in a format appropriate to the application which created the selected file, and simultaneously displaying the list along with an indication of the particular selected file in a pre-established list area on the screen and, via the selected viewer, the contents of the selected file in said appropriate format in a pre-established contents display area on the same screen without, however, actually loading and running the application with which the selected file was created.

9. The process of claim 8, wherein said list area and contents area of the screen are side-by-side windows.

10. The process of claim 8, wherein the step of creating a word index, includes, updating said word index if upon a subsequent initiation of the process any one of the stored files has been modified since the last initiation of the process.

11. The process of claim 8, further comprising indicating the user's selection from the displayed list by highlighting the selected filename in the list in said list area of the screen.

12. The process of claim 8, further comprising at any time following a user selection of a filename from said list, responsive to a single nonspecific user launch command, loading and running the application that created the selected file and opening the selected file within the application.

13. The process of claim 8, further comprising immediately following a user selection of a filename from said list, initially displaying via said selected viewer a portion of the contents of said selected file which includes the first instance of a word from said search request found in the selected file.

14. The process of claim 13, further comprising simultaneously with displaying the contents of said particular stored file via the selected viewer, highlighting words in the contents display area corresponding to the search request.

15. The process of claim 8, further comprising, in said contents display area, scrolling to display the contents of contiguous portions of said file in the appropriate format in response to scroll commands from the user.

16. The process of claim 15, further comprising
providing at least one graphic indicator on the display which the user can move between and within said list and contents display areas, the relative position of said indicator within said list in the list area indicating the user selected stored file,
generating said scroll commands in response to the position of the indicator relative to the displayed file portion when the indicator is in the contents area of the display screen.

17. The process of claim 8, wherein the filenames in said list are arranged in order of compliance with said search request.

18. The process of claim 17, further comprising
generating scores for the stored files in the list indicating the relative degree of compliance with the search request, and
displaying the scores next to the filenames in the list area.

19. The process of claim 18, wherein the step of creating a word index includes processing each stored file with a viewer selected from among said candidate viewers to divide the stored filed into words.

20. The process of claim 18, wherein the step of creating a word index includes converting the words to hash codes which are then stored in the word index in place of the words.

21. The process of claim 18, wherein the step of creating a word index includes processing each stored file with a viewer selected from among said candidate viewers to divide the stored filed into words and converting the words to hash codes which are then stored in the word index in place of the words.

22. A text search and retrieval system, comprising:
(a) an index module for a plurality of stored files comprising means for generating an index file the contents of which are representative of the contents of said stored files;
(b) an interface module connected to said index file comprising means for accepting a search request from a user and applying said search request to said index file to determine a list of stored files the contents of which satisfy said search request;

(c) a viewer module connected to said interface module comprising means for simultaneously displaying said list of stored files and the contents of a particular stored file which the user has selected from said list of stored files;

said means for displaying the contents of a particular stored file including a plurality of candidate viewers for dividing a file into words and displaying the words as text and means for selecting the viewer best capable of processing a given file; and means for using said viewers to process the stored files for producing words forming the input to said index module.

23. The system of claim 22, wherein said index file generated by said index module includes hash codes representing the words.

* * * * *